United States Patent
Welch et al.

(10) Patent No.: US 12,188,386 B2
(45) Date of Patent: Jan. 7, 2025

(54) ENGINE LUBRICATION SYSTEMS, LUBRICATION FLUID CIRCULATION SYSTEMS, AND METHODS FOR REGULATING FLUID PRESSURE

(71) Applicant: Cummins Inc., Columbus, IN (US)

(72) Inventors: Nicholas James Welch, Greenwood, IN (US); Matthew D. Flessner, Westport, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/497,175

(22) Filed: Oct. 30, 2023

(65) Prior Publication Data
US 2024/0077006 A1    Mar. 7, 2024

Related U.S. Application Data

(63) Continuation of application No. PCT/US2022/072073, filed on May 3, 2022.

(60) Provisional application No. 63/183,836, filed on May 4, 2021.

(51) Int. Cl.
*F01M 1/16* (2006.01)
*F01M 1/02* (2006.01)
*F01M 11/02* (2006.01)

(52) U.S. Cl.
CPC .............. *F01M 1/16* (2013.01); *F01M 11/02* (2013.01); *F01M 1/02* (2013.01); *F01M 2250/60* (2013.01)

(58) Field of Classification Search
CPC . F01M 11/02; F01M 1/02; F01M 1/16; F01M 2250/60
See application file for complete search history.

(56) References Cited

U.S. PATENT DOCUMENTS

| | | | |
|---|---|---|---|
| 5,722,815 | A | 3/1998 | Cozens |
| 6,810,845 | B1 | 11/2004 | Plenzler et al. |
| 7,775,503 | B2 | 8/2010 | Zhou |
| 8,511,274 | B2 | 8/2013 | Bochart |
| 9,388,804 | B2 | 7/2016 | Williamson et al. |
| 2005/0175484 | A1 | 8/2005 | Yasui |
| 2009/0229561 | A1 | 9/2009 | Yamashita et al. |
| 2011/0041798 | A1* | 2/2011 | Takahashi ................ F01M 1/20 123/196 S |

(Continued)

OTHER PUBLICATIONS

International Search Report and Written Opinion, PCT Appln. No. PCT/US22/72073, Aug. 1, 2022, 14 pgs.

*Primary Examiner* — Kevin A Lathers
(74) *Attorney, Agent, or Firm* — Taft, Stettinius & Hollister LLP

(57) ABSTRACT

A lubrication system for an internal combustion engine includes a fluid flow control device at an outlet side of the pump that regulates pressure conditions at the outlet side of the pump upstream of the lubrication circuit in the engine. The fluid flow control device is located in a recirculation path, and opens in response to a fluid pressure at the outlet of the pump exceeding a first threshold to allow the fluid to pass from the outlet side of the pump back to an inlet side of the pump. The recirculation path includes a tuning device that maintains the fluid pressure at engine speeds above the first threshold. In response to engine speeds above a second threshold, the tuning device restricts fluid flow in the recirculation path so that the fluid pressure in the fluid flow path increases.

20 Claims, 5 Drawing Sheets

(56) References Cited

U.S. PATENT DOCUMENTS

| | | |
|---|---|---|
| 2012/0055442 A1 | 3/2012 | Morinaka et al. |
| 2012/0118257 A1* | 5/2012 | Chung ............... F01M 1/20 |
| | | 123/196 R |
| 2012/0241022 A1 | 9/2012 | Watanabe et al. |
| 2012/0298222 A1 | 11/2012 | Zakay et al. |
| 2013/0343937 A1 | 12/2013 | Williamson et al. |
| 2017/0130807 A1* | 5/2017 | Kurematsu .......... F16H 7/0848 |

* cited by examiner

ENGINE LUBRICATION SYSTEMS, LUBRICATION FLUID CIRCULATION SYSTEMS, AND METHODS FOR REGULATING FLUID PRESSURE

CROSS-REFERENCE TO RELATED APPLICATION

The present application is a continuation of International PCT Application No. PCT/US2022/072073 filed on May 3, 2022, which claims the benefit of the filing date of, and priority to, U.S. Provisional Application Ser. No. 63/183,836, filed May 4, 2021, which is incorporated herein by reference.

FIELD OF THE DISCLOSURE

The present disclosure relates generally to internal combustion engines, and more particularly, but not exclusively, to pressure regulation for lubrication systems and lubrication fluid circulation systems for internal combustion engines.

BACKGROUND

Generally, fluid flow control devices have been used in internal combustion engines to control the flow of oil and other fluids to provide lubrication and cooling of one or more components of the engine. For example, pressure regulators can be used to limit or prevent excessive pressure conditions in the lubrication circuit due to operation of the oil pump.

Engine lubrication circuits are sized to provide a necessary pressure to maintain continuous oil flow throughout the range of engine operating speeds, including engine overspeed conditions. The required pressure increases parabolically with engine speed due to the centrifugal forces acting against the flow of oil through certain rotating components. Therefore, the oil pressure required at non-overspeed engine operating conditions is usually lower than the oil pressure required by the rotating components at overspeed conditions.

As a result, parasitic losses across the entire engine operating range can be increased since the regulated oil pressure is set to provide oil flow to meet pressure requirements at engine overspeed conditions, which typically occur only for a small percentage of time of operation of the engine. As such, there exists a need for reducing parasitic losses during fluid flow for lubrication and cooling of components in an internal combustion engine.

SUMMARY

The present disclosure includes a unique system and method for regulating fluid pressure in a lubrication system for an internal combustion engine. The lubrication system includes a reservoir from which fluid is fed by a pump for circulation through the lubrication system via a fluid flow path. The lubrication system includes a pressure regulator coupled to the fluid flow path downstream of an outlet side of the pump.

In an embodiment of the present disclosure, the pressure regulator allows a fluid flow into a recirculation path connecting the outlet side of the pump to an inlet side of the pump in response to an engine speed exceeding a first threshold. The lubrication system also includes a tuning device in the recirculation path configured to maintain the fluid flow in the recirculation path in response to the engine speed exceeding the first threshold, and restrict the fluid flow in the recirculation path in response to the engine speed exceeding a second threshold that is greater than the first threshold.

In another embodiment, a method of regulating fluid pressure in an internal combustion engine is provided. The method includes circulating fluid through a lubrication system of the internal combustion engine via a fluid flow path. The lubrication system includes a pump from which the fluid is fed and a recirculation path connecting an outlet side of the pump to an inlet side of the pump. The method further includes controlling, with a fluid flow control device, fluid flow through the recirculation path in response to an engine speed exceeding a first threshold. The fluid flow control device is coupled to the fluid flow path downstream of the outlet side of the pump. The method further includes maintaining the fluid flow in the recirculation path in response to the engine speed exceeding the first threshold, and restricting the fluid flow in the recirculation path in response to the engine speed exceeding a second threshold that is greater than the first threshold.

In yet another embodiment, the lubrication fluid circulation system includes a pump for circulating fluid through the lubrication system via a fluid flow path. The lubrication fluid circulation system includes a recirculation path having an inlet at a first end, an outlet at a second end opposite the first end, and a passage extending from the first end to the second end to allow fluid to flow from the inlet to the outlet. The lubrication fluid circulation system also includes a tuning device in the recirculation path. The tuning device is configured to control an amount of fluid flowing through the recirculation path so that the fluid pressure is maintained in the fluid flow path up to a predetermined speed of the engine. The tuning device restricts the amount of fluid flowing through the recirculation path when the predetermined speed of the engine is exceeded to increase fluid pressure in the fluid flow path.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The description herein makes reference to the accompanying drawings wherein like numerals refer to like parts throughout the several views, and wherein.

DETAILED DESCRIPTION OF ILLUSTRATIVE EMBODIMENTS

Figure 1:
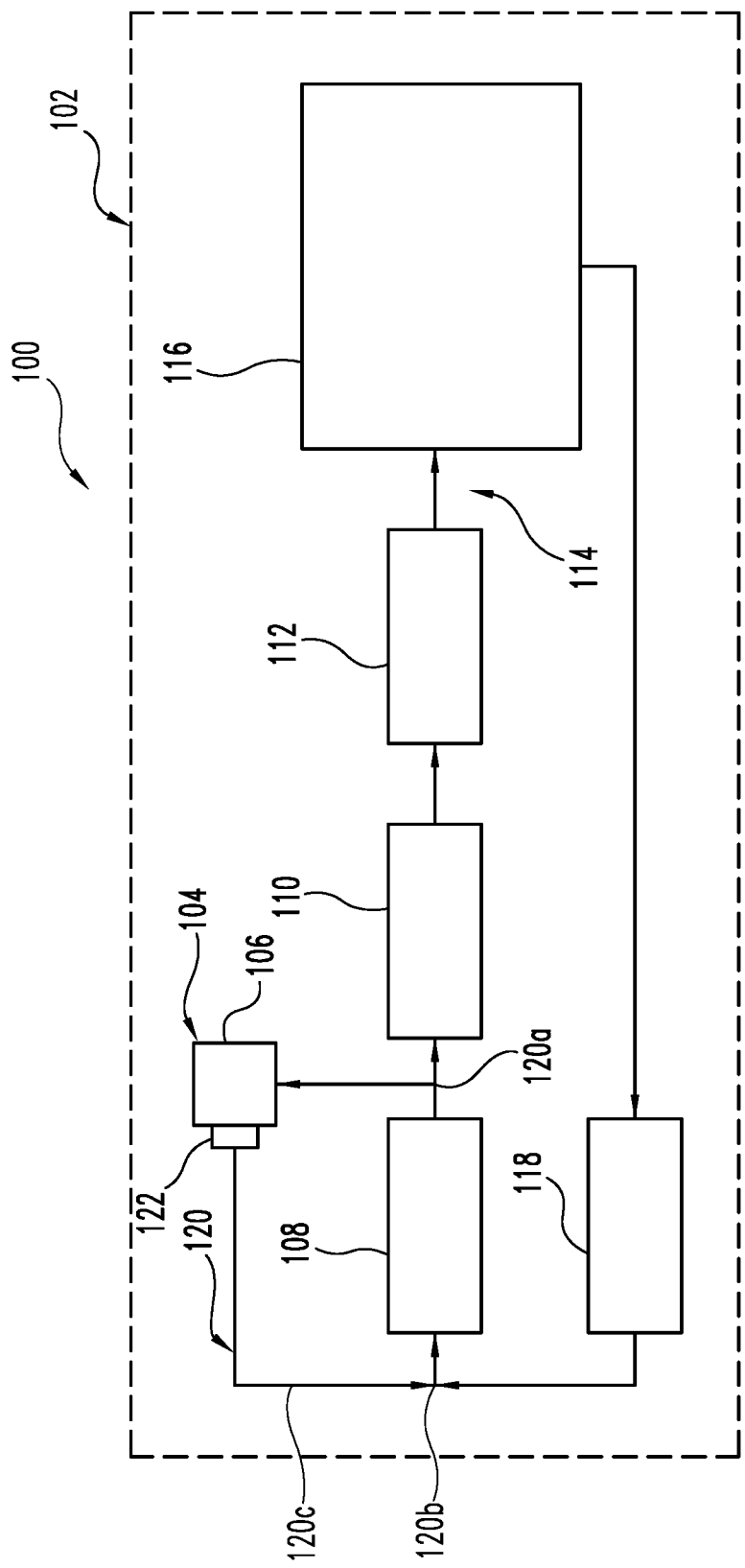
FIG. 1 is a schematic block diagram of an example lubrication system for an internal combustion engine, according to an embodiment of the present disclosure.

For the purposes of clearly, concisely and exactly describing illustrative embodiments of the present disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

Referring to FIGS. 1-7, the present disclosure relates to a lubrication system 100 for an internal combustion engine 102. In an embodiment, the lubrication system 100 includes a reservoir 118, a fluid flow path 114, a pressure regulator 106, and a tuning device 122. Fluid is fed from reservoir 118 by a pump for circulation through the lubrication system 100 via the fluid flow path 114. The pressure regulator 106 is downstream of the pump and is configured to allow a flow of the fluid through a recirculation path 120 in response to an engine speed exceeding a first threshold. The tuning device 122 is located in the recirculation path 120.

In an embodiment, the lubrication system 100 includes a lubrication fluid circulation system 101. Lubrication fluid circulation system 101 includes a pump 108, a recirculation path 120, and a tuning device 122. The tuning device 122 is configured to control an amount of the fluid flowing through the recirculation path 120 and maintain a fluid pressure in a fluid flow path 114 up to a predetermined speed of the engine. The tuning device 122 increases the fluid pressure in the fluid flow path 114 by restricting the amount of the fluid flowing through the recirculation path 120 in response to the predetermined speed of the engine being exceeded.

In an embodiment, the lubrication system 100 includes a fluid flow control device 104 configured to regulate fluid flow and/or fluid pressure in the lubrication system 100. The lubrication system 100 and/or lubrication fluid circulation system 101 includes a tuning device 122, such as an orifice, in fluid communication with a pressure regulator 106, such as a pressure regulator valve, in a recirculation path 120 for a lubrication fluid pump 108. The tuning device 122 is configured to restrict fluid flow above an engine speed threshold to increase the fluid pressure in the system 100 during engine operations above the engine speed threshold. In an example embodiment, the tuning device 122 is configured to choke or restrict the fluid flow through recirculation path 120 in response to engine speeds exceeding an engine speed threshold associated with an engine overspeed condition, thereby increasing fluid pressure in fluid flow path 114 to maintain fluid flow to engine components during the overspeed condition.

In an embodiment, the lubrication system 100 includes a reservoir 118 from which fluid is fed by pump 108 for circulation through the lubrication system 100 via fluid flow path 114. The lubrication system 100 includes a pressure regulator 106 downstream of an outlet side of the pump 108. The pressure regulator 106 can be a pressure regulator valve that is configured to allow a flow of the fluid through a recirculation path 120 in response to an engine speed exceeding a first threshold. The recirculation path 120 connects the outlet side of the pump 108 to an inlet side of the pump 108. A tuning device 122 is located in the recirculation path 120. The tuning device 122 is configured to not restrict flow of the fluid in the recirculation path 120 in response to the engine speed exceeding the first threshold. The tuning device 122 is further configured to restrict the flow of the fluid in the recirculation path 120 in response to the engine speed exceeding a second threshold that is greater than the first threshold.

In an embodiment, the lubrication fluid circulation system 101 includes pump 108 for circulating fluid through the lubrication system 100 via fluid flow path 114. Lubrication fluid circulation system 101 includes a recirculation path 120 having an inlet 120a at a first end, an outlet 120b at a second end opposite the first end, and a passage 120c extending from the first end to the second end to allow the fluid to flow from the inlet 120a to the outlet 120b. The lubrication fluid circulation system 101 includes a tuning device 122 in the recirculation path 120. The tuning device 122 is configured to control an amount of the fluid flowing through the recirculation path 120 and maintain a fluid pressure in the fluid flow path 114 up to a predetermined speed of the engine. The tuning device 122 increases the fluid pressure in the fluid flow path 114 by restricting the amount of the fluid flowing through the recirculation path 120 in response to the predetermined speed of the engine being exceeded.

In an embodiment, a method includes circulating fluid through lubrication system 100 of the internal combustion engine 102 via a fluid flow path 114. The lubrication system 100 includes a pump 108 from which the fluid is fed into the fluid flow path 114 and a recirculation path 120 connecting an outlet side of the pump 108 to an inlet side of the pump 108. The method includes controlling, with a fluid flow control device 104, fluid flow through the recirculation path 120 in response to an engine speed exceeding a first threshold. The fluid flow control device 104 is coupled to the fluid flow path 114 downstream of the outlet side of the pump 108. The method includes maintaining a substantially constant pressure in the fluid flow path 114 with the fluid flow in the recirculation path 120 in response to the engine speed exceeding the first threshold, and restricting the fluid flow in the recirculation path 120 in response to the engine speed exceeding a second threshold that is greater than the first threshold In FIG. 1, the lubrication system 100 includes fluid control device 104. Fluid flow control device 104 may be, for example, a pressure regulator 106, positioned downstream of a lubrication fluid pump 108 and upstream of a lubrication fluid filter 110. The lubrication system 100 also includes a rifle 112 that provides lubrication fluid in fluid flow path 114 to a plurality of engine components 116 and/or other rifles (not shown) for distribution about various components and locations relative to the engine 102. Lubrication fluid can be circulation through lubrication system 100 via lubrication fluid circulation system 101.

The lubrication fluid returns to a reservoir 118 such as, for example, a sump, at or near the inlet or suction side of the pump 108. Recirculation path 120 is provided in the lubrication system 100 and/or lubrication fluid circulation system 101 to allow fluid to flow therein. The recirculation path 120 may extend from an outlet of the pump 108 to the inlet of the pump 108. In the example embodiment, the lubrication system 100 and/or lubrication fluid circulation system 101 includes tuning device 122 such as, for example, an orifice 156 (FIG. 5) in the recirculation path 120.

In an embodiment of the present disclosure, the tuning device 122 is coupled in the flow path of the pressure regulator 106. Tuning device 122 is configured to not restrict flow of the fluid in the recirculation path 120 in response to the engine speed exceeding a first engines speed threshold. For example, the tuning device allows an amount of fluid flow in the recirculation path 120 that provides a nominal regulated, substantially constant fluid pressure at the pump 108 outlet during normal engine operation above a first engine speed threshold. The tuning device 122 can be configured so the fluid pressure in fluid flow path 114 is maintained at a constant pressure, or at a substantially constant pressure within an acceptable range above and/or below a target pressure, over a range of engine speeds below an engine overspeed condition. In an embodiment, maintaining the fluid pressure in fluid flow path 114 includes preventing the fluid pressure in fluid flow path 114 from increasing or decreasing proportionately with the increase or decrease of engine speed above the first engine speed threshold.

For example, below the first engine speed threshold, there is no fluid flow through the pressure regulator 106 so recirculation path 120 is closed. As the engine speed increases above first engine speed threshold, pressure regulator 106 opens and the fluid flow output at the pump 108 can vary, allowing the pressure in fluid flow path 114 to be substantially constant so as to not increase in correspondence with the engine speed increase. When the engine speed reaches a second engine speed threshold, such as an engine overspeed condition, the tuning device 122 restricts or chokes the fluid flow to or from pressure regulator 106 in recirculation path 120 so that the fluid pressure in fluid flow path 114 increases proportionately with the engine speed, while fluid flow continues at a sufficient rate to provide lubrication required by engine components 116 during engine overspeed conditions.

The tuning device 122 reduces parasitic losses by allowing the nominal regulated pressure in fluid flow path 114 between the first and second engine speed thresholds to be lower than the pressure at overspeed conditions. This reduces the power required to derive the lubrication fluid pump 108 during the most common engine operating conditions, which typically occur below the second engine speed threshold, while also providing the required fluid flow through rifle 112 to fluid flow path 114 at higher than the nominal regulated pressure during engine overspeed conditions.

It should be understood that not all components or aspects of a lubrication system are illustrated, and system 100 may be configured according to any known engine fluid lubrication system that incorporates the fluid flow control device 104 of the present disclosure. Furthermore, while the lubrication fluid may be engine oil according to one embodiment, other types of fluids and fluid circuits are also contemplated in which the fluid flow control device 104 may be employed.

Figure 2:
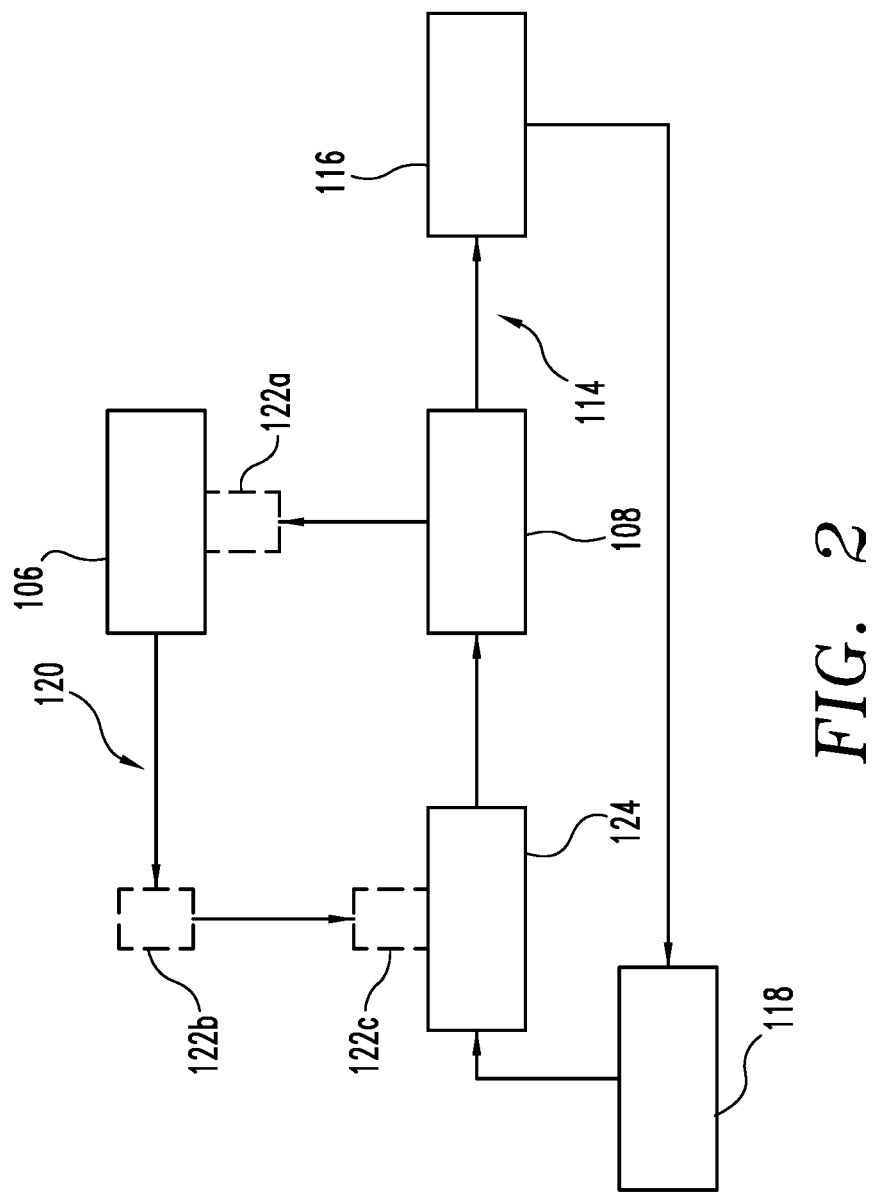
FIG. 2 is a schematic block diagram showing various possible locations for a tuning device in a recirculation path from an outlet side to an inlet side of a pump of the lubrication system of FIG. 1.

FIG. 2 is a schematic block diagram showing various possible locations for the tuning device 122 in the recirculation path 120 from the outlet side to the inlet side of the pump 108 of the lubrication system 100 and/or lubrication fluid circulation system 101 of FIG. 1. In FIG. 2, the various possible locations for the tuning device 122 are denoted by tuning device locations 122a, 122b, and 122c. In one example embodiment, the tuning device 122 is provided in the recirculation path 120 between the outlet side of the pump 108 and the pressure regulator 106 as denoted by location 122a. In another example embodiment, the tuning device 122 is provided in the recirculation path 120 between the inlet side of the pump 108 and the pressure regulator 106. For example, the tuning device 122 may be provided at an outlet of the pressure regulator 106 as denoted by location 122b. In FIG. 2, a suction tube 124 (e.g. an inlet circuit at the upstream side of pump 108) is provided in the lubrication system 100 and/or lubrication fluid circulation system 101. Therefore, in another example embodiment, the tuning device 122 is provided at an inlet of the suction tube 124 as denoted by location 122c.

Figure 3:
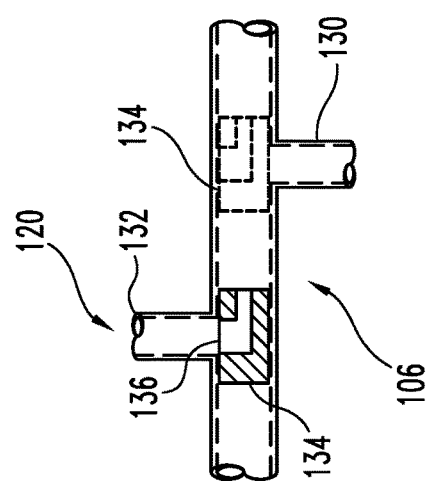
FIG. 3 is a schematic view of one embodiment of a tuning device.

It shall also be appreciated that another example embodiment of the lubrication system 100 and/or lubrication fluid circulation system 101 is configured with a tuning device 122 that is formed within the pressure regulator 106. For example, as shown in FIG. 3, the tuning device 122 can be provided by a geometry of a spool valve 134 of the pressure regulator 106 that is configured to restrict fluid flow above the second engine speed threshold. Spool valve 134, shown in section, includes a configuration that blocks inlet 130 to pressure regulator 106 in the closed configuration, as shown by the dashed spool valve 134. In the open configuration, spool valve 134 is displaced to open inlet 130, but provides a flow path 136 that is restricted in size relative to outlet 132 so that flow through recirculation path 120 is restricted during engine overspeed conditions.

The regulated recirculation path 120 provided by the spool valve 134 is sized so that the fluid pressure output by pump 108 is maintained by allowing unrestricted fluid flow in recirculation path 120 between the first and second engine speed thresholds. The fluid flow in recirculation path 120 is restricted so the pressure in fluid flow path 114 increases during engine operations above the second engine speed threshold.

Figure 4:
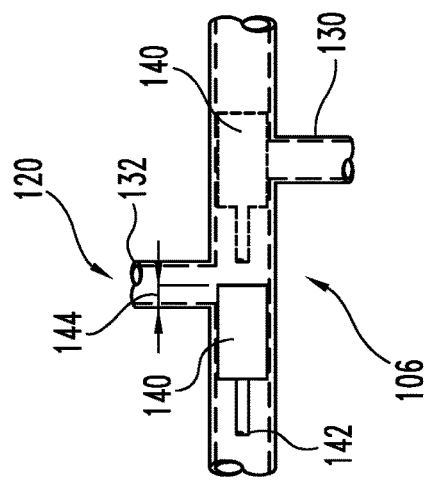
FIG. 4 is a schematic view of another embodiment of a tuning device.

In an embodiment, the pressure regulator 106 is configured with a tuning device 122 in pressure regulator 106 that limits a stroke of the plunger of pressure regulator 106. For example, as shown in FIG. 4, the tuning device 122 can be provided by limiting a stroke of a spool valve 140 in the pressure regulator 106 in order to restrict fluid flow above the second engine speed threshold. Spool valve 140 includes a closed position that blocks inlet 130 to pressure regulator 106, as shown by the dashed spool valve 140. In the open position, spool valve is displaced to no longer obstruct inlet 130. However, the stroke of plunger 142 of spool valve 140 is limited so that spool valve 140 partially blocks the outlet 132 by a protruding portion 134 of spool valve 140. As a result, the fluid flow through recirculation path 120 is restricted by spool valve 140 partially blocking outlet 132 during engine overspeed conditions while inlet 130 is open.

In the embodiments of FIGS. 3-4, the spool valve geometry and/or plunger stroke limiter limits the size of the flow path through pressure regulator 106. The regulated flow path is sized so that the fluid pressure output by pump 108 is maintained by allowing unrestricted fluid flow in recirculation path 120 between the first and second engine speed thresholds. At higher engine speeds, the spool valve geometry or positioning restrict the fluid flow in recirculation path 120 so the pressure in fluid flow path 114 increases at engine speeds above the second engine speed threshold.

In another embodiment, the pressure regulator 106 is provided with a non-linear regulator spring that allows the fluid pressure output by pump 108 to be maintained substantially constant above the first engine speed threshold rather than to continue increasing with engine speed. The non-linear spring regulates the flow path size so that the fluid pressure output by pump 108 is maintained by allowing unrestricted fluid flow in recirculation path 120 between the first and second engine speed thresholds. At higher speeds, the non-linear regulator spring provides increased resistance to the valve opening so that the fluid flow in recirculation path 120 is restricted and the pressure in fluid flow path 114 increases at engine speeds above the second engine speed threshold.

Figure 5:
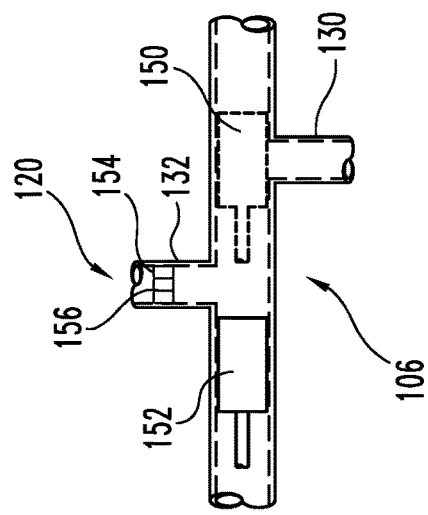
FIG. 5 is a schematic view of another embodiment of a tuning device.

In another embodiment shown in FIG. 5, tuning device 122 is an orifice 156 in recirculation path 120. For example, orifice 156 can be provided by an opening that extends through a body 154 positioned in and partially obstructing passage 120c. Body 154 can be located at any position in passage 120c, such as at outlet 132 of pressure regulator 106 or other suitable location as described herein. Pressure regulator 106 includes a first position in which valve body 150 blocks inlet 130, and a second position in which inlet 130 and outlet 132 are opened. However, the fluid flow through outlet 132 is restricted by orifice 156 at engine speeds above the second engine speed threshold.

Figure 6:
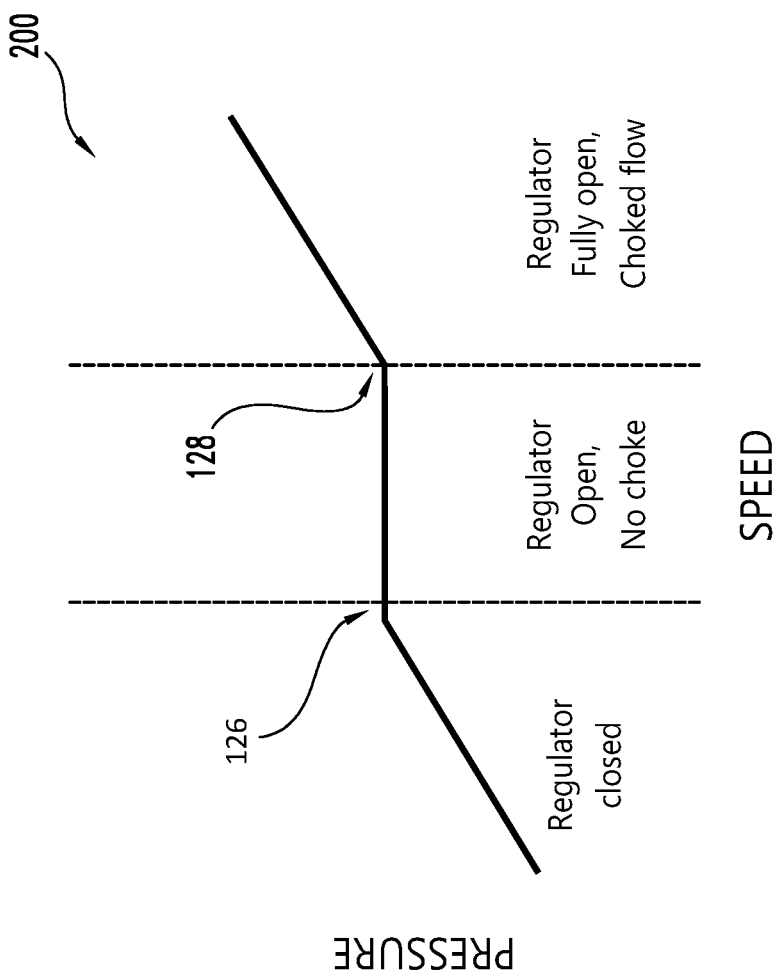
FIG. 6 is a graph of pressure versus speed showing an example operation for the tuning device in the recirculation path.

FIG. 6 is a schematic diagram showing an example operation of lubrication system 100 and/or lubrication fluid circulation system 101 with the tuning device 122 in the recirculation path 120. In operation, the pressure regulator 106 is initially closed so there is no fluid flow in recirculation path 120. The pressure regulator 106 then opens as the engine speed reaches a first engine speed threshold 126. The amount of fluid recirculated in recirculation path 120 through pressure regulator 106 and tuning device 122 allows the fluid pressure output by the pump 108 to be maintained substantially constant above the first engine speed threshold 126, and up to a second engine speed threshold 128.

The second engine speed threshold 128 may be associated with, for example, an engine overspeed condition. When engine speed exceeds the second engine speed threshold 128, the tuning device 122 restricts the fluid flow in recirculation path 120. For example, in response to the engine speed exceeding the second engine speed threshold 128, the tuning device 122 chokes the fluid flow which increases the fluid pressure output by the pump 108 since less fluid can be recirculated than is needed to maintain a constant fluid pressure. However, the tuning device 122 is configured with a predefined opening area in the recirculation path 120 that is configured to bypass the amount of fluid flow required to maintain fluid pressure constant between the first engine speed threshold 126 and the second engine speed threshold speed 128. In an embodiment, first and second engine speed thresholds are associated with normal or non-overspeed engine operating conditions.

Figure 7:
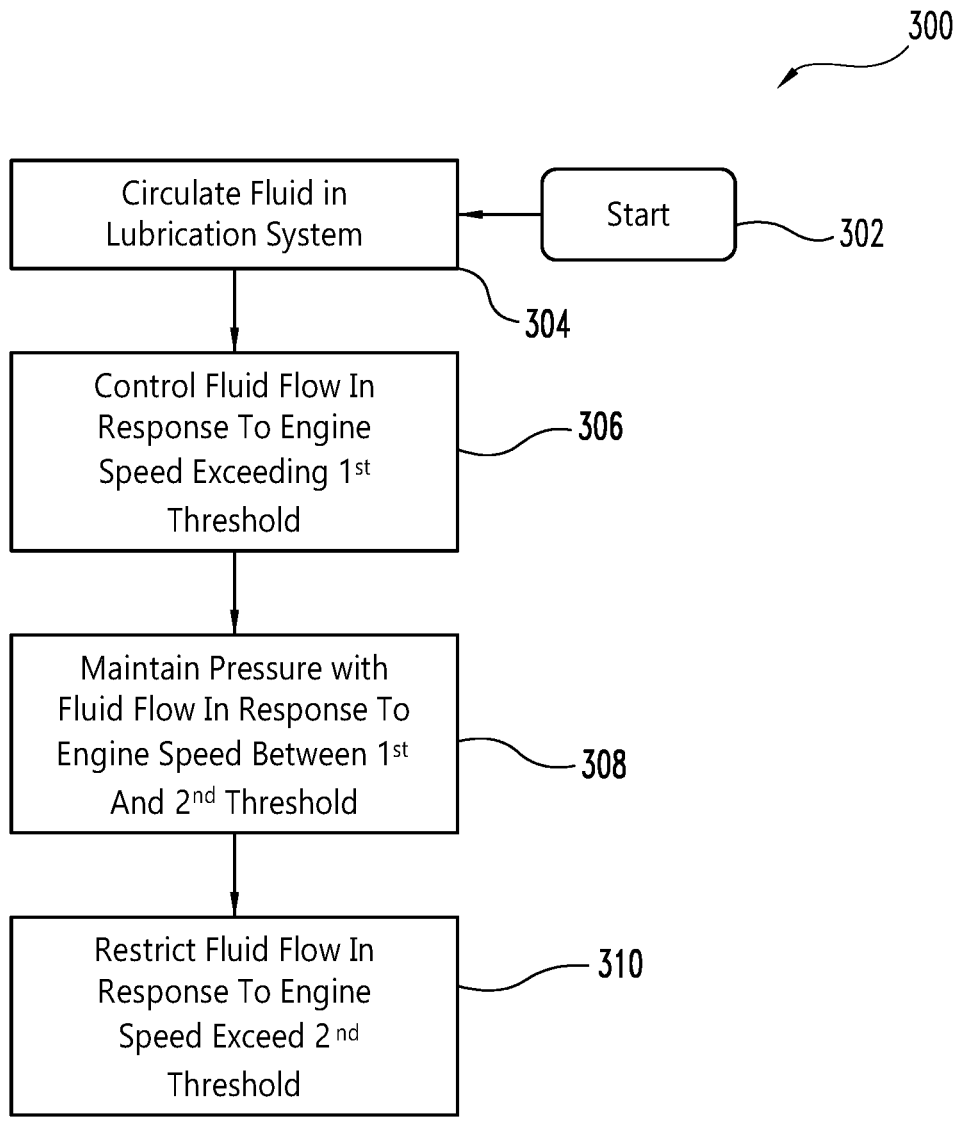
FIG. 7 is a flow diagram showing an example operating procedure of regulating fluid pressure in the lubrication system.

FIG. 7 is a flow diagram showing an example operating procedure 300 of regulating fluid pressure in the lubrication system 100 and/or lubrication fluid circulation system 101. Procedure 300 begins at start operation 302, such as an engine start-up event. Procedure 300 continues at operation 304 to circulate fluid through the lubrication system 100 and/or lubrication fluid circulation system 101. From operation 304, procedure 300 continues at operation 306 to control fluid flow, with the pressure regulator 106, through the recirculation path 120 in response to an engine exceeding a first threshold.

From operation 306, procedure 300 proceeds at operation 308. Operating 308 maintains fluid flow from pump 108 in fluid flow path 114 at a substantially constant pressure in response to the engine speed exceeding the first threshold and being less so than the second pressure. As discussed above, the tuning device 122 in the recirculation path 120 is sized to provide the amount of recirculation flow in recirculation path 120 based on engine speed that allows the rifle pressure in fluid flow path 114 to remain substantially constant.

From operation 308, procedure 300 proceeds at operation 310. Operation 310 restricts the fluid flow in the recirculation path 120 with the tuning device 122 in response to the engine speed exceeding a second threshold that is greater than the first threshold. As a result, the pressure in fluid flow path 114 increases from the substantially constant pressure produced below the second engine speed threshold. The pumping losses at engine speeds between the first and second engine speed thresholds are reduced as compared to a system without tuning device 122, such as systems that are configured with a recirculation path sized to produce a constant pressure in fluid path 114 at all engine speeds, including engine overspeed conditions, above the first engine speed threshold.

In accordance with the above-described example embodiments and implementations, a tuning device 122 such as a tuned orifice or other tuning device may be provided in a recirculation path 120 to a lubrication pump 108. The tuning device 122 is sized to allow a rifle pressure to increase above a nominal or nominally desired rifle pressure a certain engine speed threshold to provide lubrication fluid at increased pressures. The tuning device 122 does not require the recirculation path 120 in engine 102 to be reconfigured or re-sized to provide the desired pressure profile in the fluid flow path 114 across the entire range of engine speeds at which the recirculation path 120 is open.

Further written description of a number of example embodiments shall now be provided. One example embodiment is a lubrication system of an internal combustion engine. The lubrication system includes a fluid flow path and a reservoir from which fluid is fed by a pump for circulation through the lubrication system via the fluid flow path, and a pressure regulator downstream of an outlet side of the pump. The pressure regulator allows a fluid flow through a recirculation path connecting the outlet side of the pump to an inlet side of the pump in response to an engine speed exceeding a first threshold. The lubrication system further includes a tuning device in the recirculation path that is configured to not restrict fluid flow in the recirculation path in response to the engine speed exceeding the first threshold, and restrict the fluid flow in the recirculation path in response to the engine speed exceeding a second threshold that is greater than the first threshold.

In certain embodiments of the foregoing system, the fluid flow path is pressurized at a constant pressure between the first and second thresholds. In certain embodiments, the fluid flow path is pressurized at a fluid pressure in the fluid flow path that progressively increases as the engine speed increased above the second threshold.

In certain embodiment, the tuning device is an orifice in the recirculation path between the outlet side of the pump and the pressure regulator. In certain embodiments, the tuning device is an orifice in the recirculation path between the inlet side of the pump and the pressure regulator. In certain embodiments, the orifice is located at an outlet of the pressure regulator. In certain embodiments, the orifice is located at an inlet of the pump.

In certain embodiments, the tuning device is a spool geometry of the pressure regulator. In certain embodiment, the tuning device is a plunger stroke limiter of the pressure regulator. In certain embodiments, the pressure regulator is closed during engine speeds less than the first threshold.

Another example embodiment is a method of regulating fluid pressure in an internal combustion engine. The method includes circulating fluid through a lubrication system of the internal combustion engine via a fluid flow path. The lubrication system includes a pump from which the fluid is fed into the fluid flow path and a recirculation path connecting an outlet side of the pump to an inlet side of the pump. The method further includes controlling, with a fluid flow control device, fluid flow through the recirculation path in response to an engine speed exceeding a first threshold. The fluid flow control device is in the recirculation path downstream of the outlet side of the pump. The method further includes maintaining the fluid flow in the recirculation path in response to the engine speed exceeding the first threshold, and restricting the fluid flow in the recirculation path in response to the engine speed exceeding a second threshold that is greater than the first threshold.

In an embodiment of the foregoing method, maintaining the fluid flow in the recirculation path includes maintaining the substantially constant pressure in the fluid flow path between the first and second thresholds. In an embodiment, restricting the fluid flow includes increasing a fluid pressure in the fluid flow path at engine speeds above the second threshold.

In an embodiment of the method, restricting the fluid flow includes restricting the fluid flow through an orifice located between the outlet side of the pump and the fluid flow control device. In another embodiment, restricting the fluid flow includes restricting the fluid flow through an orifice located between the inlet side of the pump and the fluid flow control device.

In an embodiment, restricting the fluid flow in the recirculation path includes restricting the fluid flow with a pressure regulator that restricts the fluid flow in the recirculation path in response to the engine speed exceeding the second threshold. In an embodiment, the method includes closing the fluid flow control device at engine speeds less than the first threshold to prevent fluid flow through the recirculation path.

Yet another example embodiment is a lubrication fluid recirculation system for an internal combustion engine. The lubrication fluid recirculation system includes a pump for circulating fluid through the lubrication system via a fluid flow path. The lubrication fluid recirculation system includes a recirculation path having an inlet at a first end, an outlet at a second end opposite the first end, and a passage extending from the first end to the second end to allow the fluid to flow from the inlet to the outlet. The lubrication fluid recirculation system further includes a tuning device in the recirculation path. The tuning device is configured to control an amount of the fluid flowing through the recirculation path and maintain a fluid pressure in the fluid flow path up to a predetermined speed of the engine. The tuning device increases the fluid pressure in the fluid flow path by restricting the amount of the fluid flowing through the recirculation path in response to the predetermined speed of the engine being exceeded.

In an embodiment, the recirculation path includes a pressure regulator that prevents fluid flow through the recirculation path at engine speeds below a first threshold. The pressure regulator is configured to open at engine speeds above the first threshold to permit fluid flow through the recirculation path.

While illustrative embodiments of the disclosure have been illustrated and described in detail in the drawings and foregoing description, the same is to be considered as illustrative and not restrictive in character, it being understood that only certain exemplary embodiments have been shown and described and that all changes and modifications that come within the spirit of the claimed inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A lubrication system for an internal combustion engine, the system comprising:
    a fluid flow path and a reservoir from which fluid is fed by a pump for circulation through the lubrication system via the fluid flow path;
    a pressure regulator downstream of an outlet side of the pump, the pressure regulator configured to allow a flow of the fluid through a recirculation path in response to an engine speed exceeding a first threshold, the recirculation path connecting the outlet side of the pump to an inlet side of the pump; and
    a tuning device in the recirculation path so that fluid flowing in the recirculation path from the outlet side of the pump to the inlet side of the pump flows through the tuning device, the tuning device being configured to:
        not restrict flow of the fluid in the recirculation path passing through the tuning device in response to the engine speed exceeding the first threshold; and
        restrict the flow of the fluid in the recirculation path passing through the tuning device in response to the engine speed exceeding a second threshold that is greater than the first threshold.

2. The system of claim 1, wherein the fluid flow path is pressurized at a fluid pressure that is substantially constant between the first and second thresholds.

3. The system of claim 2, wherein the fluid flow path is pressurized at a fluid pressure that progressively increases as the engine speed increases above the second threshold.

4. The system of claim 1, wherein the tuning device is an orifice in the recirculation path between the outlet side of the pump and the pressure regulator.

5. The system of claim 1, wherein the tuning device is an orifice in the recirculation path between the inlet side of the pump and the pressure regulator.

6. The system of claim 5, wherein the orifice is located at an outlet of the pressure regulator.

7. The system of claim 5, wherein the orifice is located at an inlet of the pump.

8. The system of claim 1, wherein the tuning device is a spool valve in the pressure regulator.

9. The system of claim 1, wherein the tuning device is a plunger stroke limiter in the pressure regulator.

10. The system of claim 1, wherein the pressure regulator is closed during engine speeds less than the first threshold.

11. A method of regulating fluid pressure in an internal combustion engine, the method comprising:
    circulating fluid through a lubrication system of the internal combustion engine via a fluid flow path, the lubrication system including a pump from which the fluid is fed into the fluid flow path and a recirculation path connecting an outlet side of the pump to an inlet side of the pump, the fluid in the recirculation path flowing through a fluid flow control device and a tuning device;

controlling, with the fluid flow control device, fluid flow through the recirculation path in response to an engine speed exceeding a first threshold, the fluid flow control device in the recirculation path downstream of the outlet side of the pump;

maintaining a substantially constant pressure in the fluid flow path with the fluid flow in the recirculation path in response to the engine speed exceeding the first threshold; and restricting the fluid flow through the tuning device in the recirculation path in response to the engine speed exceeding a second threshold that is greater than the first threshold.

12. The method of claim 11, wherein maintaining the substantially constant pressure in the fluid flow path includes maintaining the substantially constant pressure between the first and second thresholds.

13. The method of claim 12, wherein restricting the fluid flow includes increasing a fluid pressure in the fluid flow path at engine speeds above the second threshold.

14. The method of claim 11, wherein restricting the fluid flow includes restricting the fluid flow through an orifice located between the outlet side of the pump and the fluid flow control device.

15. The method of claim 11, wherein restricting the fluid flow includes restricting the fluid flow through an orifice located between the inlet side of the pump and the fluid flow control device.

16. The method of claim 11, wherein the tuning device is configured to only restrict the fluid flow in the recirculation path in response to the engine speed exceeding an engine overspeed condition that corresponds to the second threshold.

17. The method of claim 11, wherein restricting the fluid flow in the recirculation path includes restricting the fluid flow with a pressure regulator that restricts the fluid flow in the recirculation path in response to the engine speed exceeding the second threshold.

18. The method of claim 11, further comprising closing the fluid flow control device at engine speeds less than the first threshold to prevent fluid flow through the recirculation path.

19. A lubrication fluid circulation system for an internal combustion engine, the system comprising:

a pump for circulating fluid through the lubrication system via a fluid flow path;

a recirculation path having an inlet at a first end, an outlet at a second end opposite the first end, and a passage extending from the first end to the second end to allow the fluid to flow from the inlet to the outlet; and a tuning device in the recirculation path so that fluid flowing in the recirculation path from the outlet side of the pump to the inlet side of the pump flows through the tuning device, the tuning device being configured to control an amount of the fluid flowing through the tuning device in the recirculation path and maintain a fluid pressure in the fluid flow path up to a predetermined speed of the engine, wherein the tuning device increases the fluid pressure in the fluid flow path by restricting the amount of the fluid passing through the tuning device that flows through the recirculation path in response to the predetermined speed of the engine being exceeded.

20. The lubrication fluid circulation system of claim 19, wherein the recirculation path includes a pressure regulator that prevents fluid flow through the recirculation path at engine speeds below a first threshold, the pressure regulator being configured to open at engine speeds above the first threshold to permit fluid flow through the recirculation path.

* * * * *